United States Patent [19]

Warmack et al.

[11] Patent Number: 4,463,451
[45] Date of Patent: Jul. 31, 1984

[54] SYSTEM FOR SEISMIC DIGITAL DATA ACQUISITION OVER WATER COVERED AREAS

[75] Inventors: Ralph E. Warmack; O. Guy Marney, Jr.; John N. Gallagher, all of Tulsa, Okla.; Paul R. Passmore, Dallas, Tex.

[73] Assignee: The Standard Oil Company, Chicago, Ill.

[21] Appl. No.: 338,468

[22] Filed: Jan. 11, 1982

[51] Int. Cl.³ .............................................. G01V 1/38
[52] U.S. Cl. ......................................... 367/16; 367/3; 367/77; 181/110; 181/402
[58] Field of Search ............... 367/3, 4, 15, 16, 77; 37/73, 74; 43/27.2; 405/224; 102/411, 410; 181/110, 402; 248/18

[56] References Cited

U.S. PATENT DOCUMENTS

| | | | |
|---|---|---|---|
| 2,324,378 | 7/1943 | Flude | 181/110 |
| 2,780,301 | 2/1957 | Jakosky | 367/16 |
| 3,062,315 | 11/1962 | Herzog | 367/77 |
| 3,369,216 | 2/1968 | Laper | 367/16 |
| 4,138,658 | 2/1979 | Avedik et al. | 367/15 |
| 4,236,234 | 11/1980 | McDavid et al. | 367/77 |

OTHER PUBLICATIONS

Wiley, "Telemetry Studies Pollution", 12/8/61, p. 28, Electronics, vol. 34, #49.
Fairfield Industries, Telsers System Specs., Houston, Texas, ≈ 1973.

Primary Examiner—Nelson Moskowitz
Attorney, Agent, or Firm—S. H. Brown; Timothy D. Stanley

[57] ABSTRACT

A seismic data acquisition system for use in shallow water covered areas comprises a flotation device which serves also to house the electronic components; anchoring device with mechanical filter device to protect the anchor, so as to insure its maintaining its position; seismic sensor device for detecting seismic waves in the water and converting them to electrical signals; radio receiver device for receiving operational control instructions; and device for amplifying, digitizing and storing the electrical signals provided by the sensor, preferably on a removable tape recording device.

7 Claims, 9 Drawing Figures

SYSTEM FOR SEISMIC DIGITAL DATA ACQUISITION OVER WATER COVERED AREAS

CROSS-REFERENCE TO RELATED PATENT

This application is related to a U.S. Patent in the name of Broding et al., U.S. Pat. No. 3,806,864, issued on Apr. 23, 1974, entitled "CABLELESS SEISMIC DIGITAL RECORDING SYSTEM." U.S. Pat. No. 3,806,864 is entered by reference into this application.

BACKGROUND OF THE INVENTION

1. Field of the Invention

This invention lies in the field of seismic data acquisition systems. More particularly, it concerns a cableless acquisition system for use over water covered areas.

2. Description of the Prior Art

One of the important features of the acquisition apparatus, namely the electronic portions, is taught by Broding et al. The Broding et al. patent, U.S. Pat. No. 3,806,864, is entered into this application to illustrate at least one type of electronic apparatus that can be used in the acquisition system of this invention. Broding et al. teaches the remote control by radio of a plurality of receiving and recording units. Each of these recording units is attached to a seismic sensor at a selected point on the earth. Such separate recording units obviate the need of cables connected between each of the sensor positions and from them to the central recording apparatus.

It is also known in the art that a floating seismic sensor can be used to generate its electrical signals derived from corresponding seismic waves detected in the water in which it floats. These signals are then transmitted by radio to a central recording station.

This invention relates to novel designs of flotation apparatus and more particularly of the anchoring means to insure that the anchor remains in a fixed position.

SUMMARY OF THE INVENTION

It is a primary object of this invention to provide a cableless seismic digital data acquisition system for use over water covered areas.

It is a further object to provide a recording system in which the control of the system is obtained by means of radio transmitted coded signals from a central control point to each of the floating recording units.

It is a still further object to provide a flotation system for the electronic apparatus which can be floated in rough and windy weather and will maintain an upright position of the radio receiver antenna, the better to receive the control signals.

It is a still further object of this invention to provide a simple and effective anchoring system for the floating radio receiver and sensor signal processing means, so that the anchor will not be caused to move even with heavy wave, wind and current action on the floating system.

In the prior art, of course, there are many examples of deep water seismic data acquisition systems, wherein all of them use cables by means, direct or by multiplexing, to carry the electrical signals to a central recording and control point. These will not be considered further since they are not cableless recording systems.

These and other objects are realized and the limitations of the prior art are overcome in this invention by providing a flotation system having a housing of selected shape for better flotation, and an anchoring means that is improved over any that have been tried, to restrain the movement of the floating electronic package over water covered areas. The circuitry of the radio receiver control means and seismic amplifying, digitizing and recording means can be conventional. As an illustration of these parts of the system, the patent to Broding et al. has been entered as part of this application.

The flotation means comprises a housing for the electronic and radio apparatus, and comprises a thin-walled metal shell constructed in the shape of a short cylindrical shell having a vertical axis, and having a rounded bottom portion, and a rounded top portion. The top portion has means for supporting the radio antenna, which is an upwardly-directed axial projection of the housing, coaxial with the housing, and supporting at the top a spar type radio receiving antenna.

A seismic sensor, preferably of the pressure sensitive type, is attached by means of electrical conductors in the anchoring cable to the electronics package inside of the housing.

The anchoring system comprises a conventional anchor having flukes that will dig into the sea floor, responsive to a steady pull on the handle. The anchor is attached to the anchoring cable itself which comprises a tension means, as well as an electrical signal carrying means. The anchor is connected to the cable through a mechanical filter, the purpose of which is to iron out all of the many recurring sharp pulls and jerks of the floating means attached to the cable.

We have found that without the mechanical filter means, these pulls and jerks will eventually loosen the flukes in the sea floor and the anchor will then not hold the buoy, or float, in position. The mechanical filter means can be made of at least two elements, a series connected extensible elastic member and a mass adapted to rest on the sea floor. The filter is atached to the anchor, preferably by a flexible cable or an additional extensible flexible member.

In excessively choppy seas it may be desirable to add a second section of mechanical filter, connected in series with the first filter, to more completely filter out the recurring tensile pulls and jerks on the anchoring cable.

The seismic sensor is exposed to the hydrostatic pressure and to the passing seismic waves to generate an electrical signal corresponding to the seismic waves received. These signals are transmitted through the electrical conductors in the anchoring cable to the amplifier, digitizer and recorder inside the housing. Instructions as to when, and if, to record at any given time are received by means of a coded signal by the radio receiver, through the medium of the antenna.

The extensible flexible member is preferably more elastic than the anchoring cable. Consequently, the extensible flexible member will yield in response to force applied through the anchoring cable to the mass and anchor and relieves the tension in the cable, thereby reducing the risk of cable fatigue and/or breakage.

The seismic data acquisition system of this invention has particular advantage in shallow water covered areas, such as swamps, marshes, lakes, rivers, etc., as well as offshore areas. By shallow water is meant water to a depth of approximately 200 feet or less. The seismic data acquisition system of this invention, which is intended for deployment in water covered areas, can also be used in combination with land based seismic data acquisition devices for seismic mapping over water covered areas which are contiguous with land areas.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
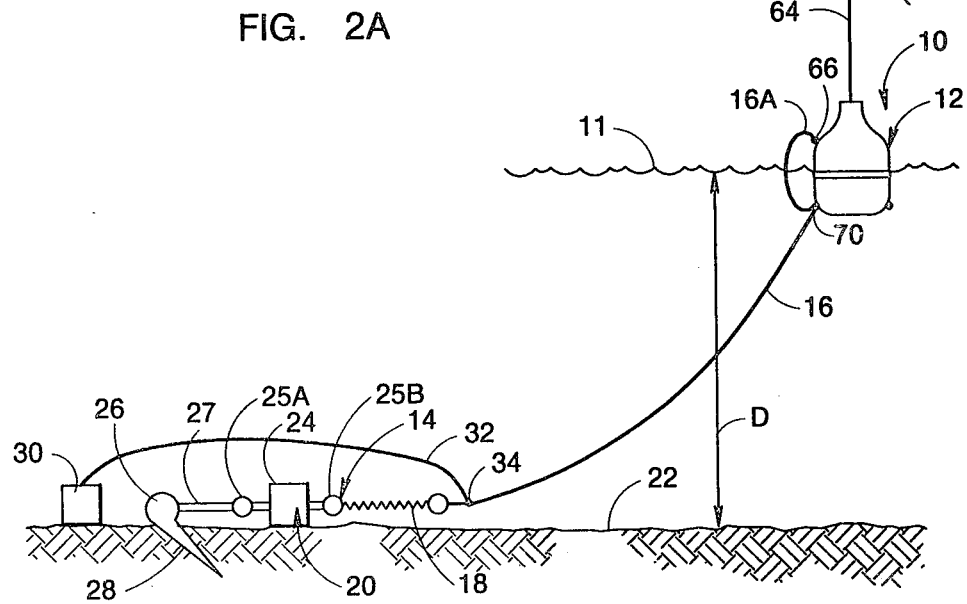
FIG. 1 is a schematic view of the flotation means and the anchor means of this invention.

Referring now to the drawings and in particular to FIG. 1, there is shown one embodiment of the invention, which includes a number of parts. A flotation means 12 includes a housing adapted to float with minimal rolling action, so as to maintain a receiving radio antenna 64 in vertical position, to maximize the received radio signal.

Figure 4:
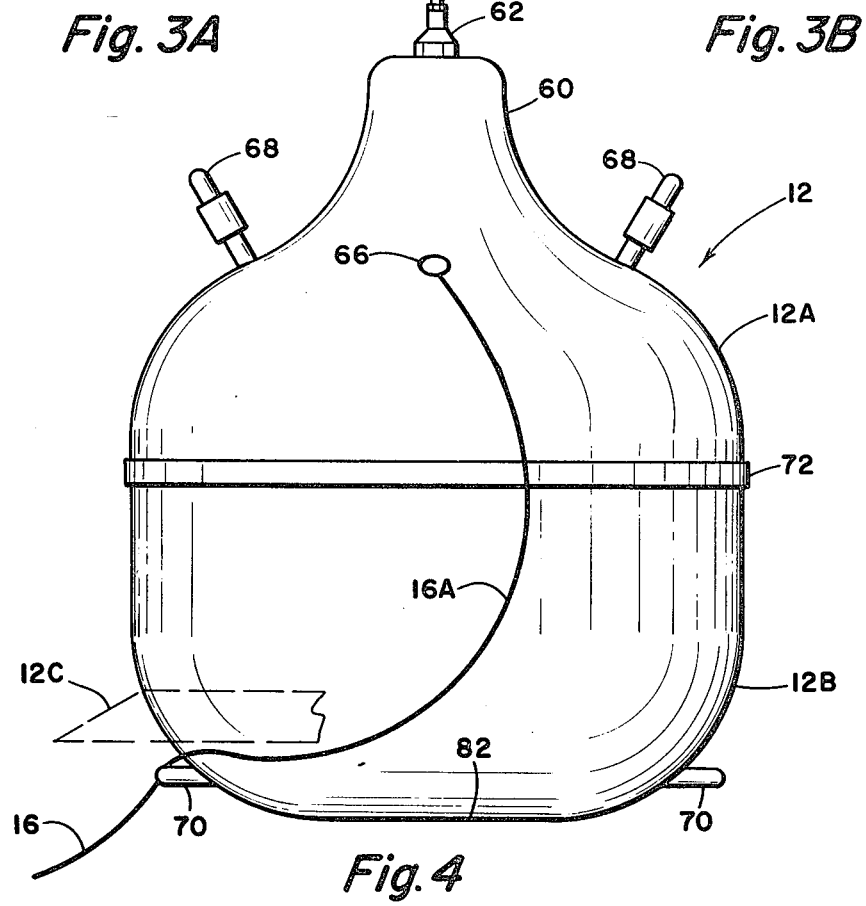
FIG. 4 illustrates one embodiment of the flotation element of this acquisition system.

The flotation housing 12, as will be discussed in connection with FIG. 4, is made in two parts 12A and 12B, which are joined by a coupling 72. The electronic apparatus and the radio receiver are housed in the flotation means 12. The electrical connection between the seismic sensor 30, which is positioned at or near the sea floor 22, which is at a depth D below the surface of the water 11, is by means of cable 16. There is a mechanical filter indicated generally by the numeral 14, which comprises at least two parts, a series spring element 18 and a mass element 20, to which the anchor cable 16 is connected at one end and the anchor 26 is connected at the other end.

The anchor 26 is shown with its flukes 28 pressed into the mud on the sea floor 22. The electrical cord 32 from the sensor 30, is joined to the electrical conductors in the tension cable 16 at point 34 and pass up through the portion 16A to a connector plug 66 in the flotation means 12. The cable 16 is clamped, or bound, to a handle 70 at the bottom of the flotation means 12.

We have found, in using floating electronic apparatus packages, that must be anchored, with the wind, current and waves interacting on the floating means or buoy, that there are a great number of very frequent sharp pulls and jerks placed on the anchoring cable 16 by the alternating pressures on the buoy 12. This is particularly true when the water is choppy. When the anchoring cable 16 is attached directly to the handle 27 of the anchor 26 these pulsations in the cable tend to jar the flukes loose from their hold in the sea floor, and thus the anchor eventually pulls out and fails to hold the buoy in position.

We have found, therefore, that a mechanical filtering means, indicated generally by the numeral 14 which will filter out these sharp forces, will be helpful. The filter comprises at least one spring-mass series system which can filter out these high frequency pulls and prevent them from reaching the anchor. Thus, a more or less constant horizontal pull is applied to the anchor handle 27 which serves to hold the anchor more tightly in the floor. Thus, the low-frequency-pass mechanical filter means is an important part of this invention.

Figure 2C:
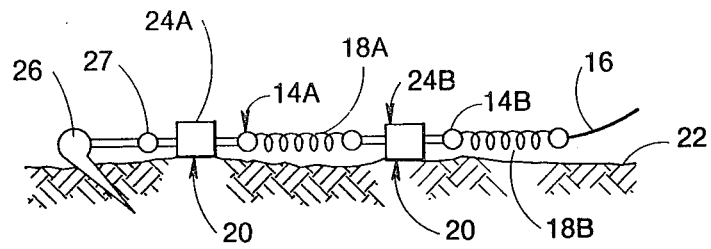
FIGS. 2A, 2B and 2C illustrate alternate embodiments of the mechanical filter system in the anchoring means of this invention.

Moving temporarily to FIG. 2C, there is shown a second embodiment, in which there are two series filter elements 14A and 14B. The first stage 14A has extensible elastic element 18A and a drag mass 24A, while the second filter stage 14B has an extensible elastic element 18B and a drag mass 24B. This would be equivalent to two series stages of mechanical filter. If desired, there can be more stages.

Figure 3A:
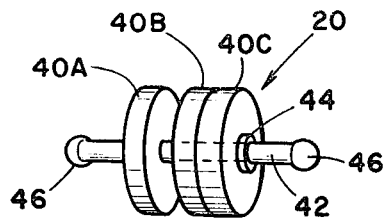
FIGS. 3A and 3B illustrate two alternative embodiments of the drag weight which forms part of the mechanical filter.
Figure 3B:
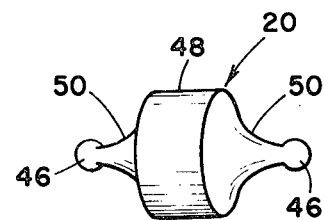

Referring now to FIGS. 3A and 3B, we show two embodiments of a drag mass 20, which is part of the mechanical filtering means 14. FIG. 3B shows a simple design made of a single monolithic casting of heavy metal, such as iron, which comprises a more or less cylindrical portion 48, having two rod-like axial projections 50, projecting out of both ends of the cylinder 48. There are two means 46 for attachment of cables or other linear tension members to the projections 50.

In FIG. 3A another embodiment is shown, which comprises a plurality of thin cylindrical discs 40A, 40B and 40C having an axial opening therethrough. A rod 42 is positioned in the central opening within the discs and is locked by means of 44, so that the rod 42 will project out of each end, as in the case of FIG. 3B. Again, means 46 which may be a ring or clevis is provided at each end for attachment of cables or other tension means. The shape and size of the drag masses 20 are not critical. It is desirable to have them cylindrical rather than square or cubical, so that they may move laterally more readily. Somewhat sharp longitudinal edges such as the contact of the outer edges of the discs, or of the central cylinder 48, would provide some resistance to drag. This would offer some damping to possible oscillation between the elastic member 18 and the mass 20. In general, it would be preferred that the projecting ends 42 and 50 be more or less horizontal, and thus parallel to the sea floor, so that any pulls on the anchor handle 27 will be in a horizontal direction, rather than upwardly directed pulls.

In FIG. 1 is shown the filter 14 having a single elastic linear member 18 and a single mass member 24, with the second end of the mass member 25A attached to the handle 27 of the anchor. In FIG. 2A there has been inserted, between the second end 25A of the mass 20 and the handle 27 of the anchor, a linear tension member such as a cable or cord 35.

Figure 2B:
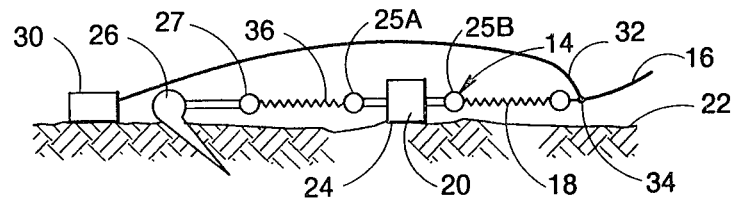
Figure 2A:
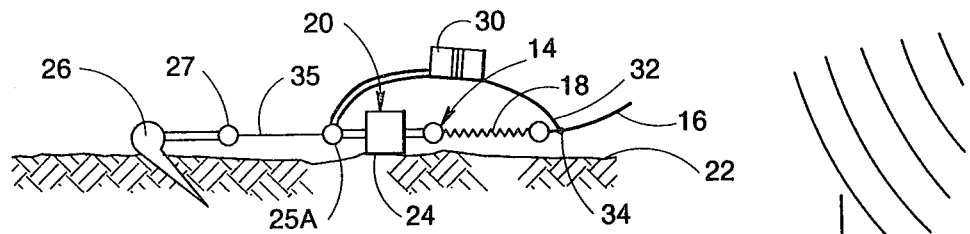

In FIG. 2B a second elastic extensible member 36 has been placed between the end 25A of the drag mass 24 and the handle 27 of the anchor, so that the filter now comprises two series elastic elements with a single mass attached between the two extensible members.

FIGS. 1, 2A and 2B show the elastic extensible members of the flexible extensible members 18 in the form of a zigzag line, which schematically would indicate a type of elastic member, which would indicate an extensible member. This can be an elastic means such as the common stretch cords that are familiar in and around small airplanes. They may also be helical springs of metal or any other similar means, provided they have a selected spring constant, which in connection with the selected mass of the drag mass 20, provide the desired filtering.

FIG. 2C schematically indicates a helical spring type of flexible extensible means 18A and 18B.

Referring now to FIG. 4, there is shown one embodiment of our buoy or flotation housing 12 for housing the electronic radio and recording apparatus. In general it can be made in two parts, such as the upper portion 12A and lower portion 12B as shown. The general contour is of a central cylindrical shell with a rounded corner top portion and a rounded corner bottom portion, having a flattened bottom 82, so that the device will rest on a flat deck. Various types of handles can be attached as desired, such as the two upper handles 68 and/or the two lower handles 70. A clamp 72 of conventional design and sealing means are provided.

The upper half of the housing has a projecting axial portion 60 which serves as a mounting point for the antenna 64, through the means of a coupling nut 62. This is sealed through the shell of the top projecting portion 12A. Similarly, there is a connector plug 66 which is sealed through the wall of the top portion 12A. This plug 66 seals the electrical connections between the sensor cable 32 which is joined at 34 to the electrical conductors in the tension cable 16, and a portion 16A, to the terminal 66. The portion 16A is an extension of the cable 16 which is clamped to the handle 70, for example, so that the pull of the anchor will be on the bottom portion of the buoy 12. The dashed line 12C indicates a possible addition to the housing, which would be a skirt or vane, for the purpose of damping out high frequency oscillations of the buoy, as may be set up by means of waves, wind or current, so as to maintain a more stabilized position in the water.

The buoy can be quickly disassembled and assembled by means of a circular clamp 72 of conventional design and including a suitable gasket, such as an O-ring, for example. This makes it possible say, at the end of the day, when the buoys are picked up, that they can be opened and the recording cassette can be removed, a new cassette placed in the recorder for use on the following day, and so on.

Figure 5:
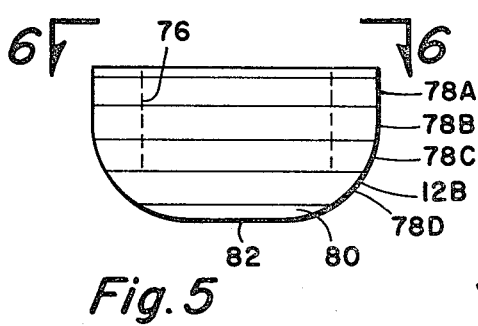
FIGS. 5 and 6 illustrate further details of the lower portion of the flotation apparatus of FIG. 4.
Figure 6:
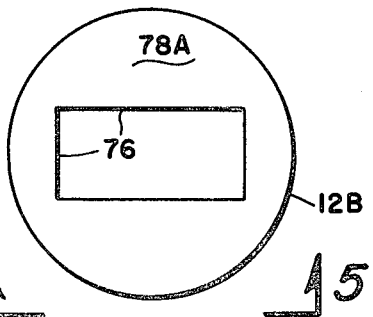

While any conventional type of seismic data processing and recording system can be used, we have indicated that one of the most desirable systems of that sort is illustrated by the patent to Broding et al. FIGS. 5 and 6 are shown as indication of a possible method of positioning and supporting a rectangular box in a suitable cavity 76 inside the lower half 12B of the buoy.

In the very bottom is a disc 80, of lead or other dense material, which serves as a weighting means to keep the center of gravity below the center of flotation for stable flotation. The other layers 78A, 78B, 78C and 78D indicate sheets of elastic foam material, shaped to the interior of the shell and providing a rectangular space 76 which would be suitable for positioning the electronic equipment, such as the seismic group recorder of Broding et al.

We have not described in any detail whatsoever the electronic apparatus, the method of transmitting coded signals by radio to the buoys and related matters, since all of this apparatus is conventional, a good example of which is the seismic group recorder of Broding et al., as described in U.S. Pat. No. 3,806,864.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A marine seismic data acquisition system, comprising:
    a seismic recording system;
    a float adapted to house said seismic recording system;
    a cable having one end thereof attached to said float;
    an anchor adapted to fix the position of said float to the sea floor; and
    tension filter means serially attaching an opposite end of said cable to said anchor for filtering out mechanical forces tending to jar said anchor loose.

2. The apparatus as in claim 1 in which said tension filter means comprises at least one series combination of spring and mass.

3. The apparatus as in claim 1 in which said tension filter means comprises:
    a first selected length of flexible extensible tension means attached at its first end to the opposite end of said cable;
    a drag weight of selected mass connected at its first end to the second end of said flexible extensible tension means; and
    said anchor attached to the second end of said drag weight.

4. The apparatus as in claim 3 in which said flexible extensible tension means comprises a stretched cord.

5. The apparatus as in claim 3 in which said flexible extensible tension means comprises a helical spring.

6. The apparatus as in claim 3 in which said drag weight comprises:
    at least one flat cylindrical weight of heavy material having an axial opening;
    a rod passing through and locked in said axial opening so that it extends at both ends beyond the faces of said weight; and
    means at each of said rod means to attach said flexible extensible tension means.

7. The apparatus as in claim 3 in which said drag weight comprises a monolithic structure of a heavy metal in the form of a central cylinder of selected diameter and length with projecting axial rods at both ends.

* * * * *

UNITED STATES PATENT AND TRADEMARK OFFICE
CERTIFICATE OF CORRECTION

PATENT NO. : 4,463,451

DATED : July 31, 1984

INVENTOR(S) : Ralph E. Warmack, et al.

It is certified that error appears in the above—identified patent and that said Letters Patent is hereby corrected as shown below:

Column 6, line 24, after "out" insert --high frequency--; line 25, after "loose" add:

--; and

> said tension filter means exerts a generally constant horizontal force on said anchor.--

Signed and Sealed this

Eighteenth Day of December 1984

[SEAL]

Attest:

GERALD J. MOSSINGHOFF

Attesting Officer

Commissioner of Patents and Trademarks